US012288937B2

(12) United States Patent
Huang

(10) Patent No.: US 12,288,937 B2
(45) Date of Patent: Apr. 29, 2025

(54) ANTENNA SYSTEM WITH SWITCHABLE RADIATION GAIN

(71) Applicant: Wistron NeWeb Corp., Hsinchu (TW)

(72) Inventor: Chun-Lin Huang, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 224 days.

(21) Appl. No.: 18/329,734

(22) Filed: Jun. 6, 2023

(65) Prior Publication Data

US 2023/0420845 A1 Dec. 28, 2023

(30) Foreign Application Priority Data

Jun. 27, 2022 (TW) .................................. 111123868

(51) Int. Cl.
*H01Q 5/335* (2015.01)

(52) U.S. Cl.
CPC .................................. *H01Q 5/335* (2015.01)

(58) Field of Classification Search
CPC .............................. H01Q 5/335; H01Q 21/10
See application file for complete search history.

(56) References Cited

U.S. PATENT DOCUMENTS 2,111,589 A * 3/1938 Holst ...................... H03G 9/10 455/249.1
3,407,353 A * 10/1968 Doble ...................... H04B 3/11 324/76.83
3,462,606 A * 8/1969 Case ...................... H04L 25/26 250/214 R
4,229,669 A * 10/1980 Smith .................. H03K 5/1536 327/79
5,654,550 A * 8/1997 Nomura .................... G01J 1/44 250/338.3
5,926,150 A * 7/1999 McLean ............ G01R 29/0821 343/846
5,969,690 A * 10/1999 Yamabayashi ........... H01Q 9/16 343/792
6,177,796 B1 * 1/2001 Viti .................... G01R 33/3621 324/309
8,929,945 B1 * 1/2015 Wei ...................... H04B 1/0057 330/195
9,048,535 B1 * 6/2015 Desclos ................. H01Q 5/335
10,063,326 B1 * 8/2018 Sternowski .............. H04B 1/04
(Continued)

*Primary Examiner* — Hai V Tran
*Assistant Examiner* — Jordan E. DeWitt
(74) *Attorney, Agent, or Firm* — McClure, Qualey & Rodack, LLP

(57) ABSTRACT

An antenna system with switchable radiation gain includes a signal feeding element, a first antenna element, a second antenna element, a first diode, a first switch element, a second switch element, a first impedance transformer, and a second impedance transformer. The first antenna element is coupled to a first connection point. The second antenna element is coupled to a second connection point. The first diode has an anode coupled to the first connection point, and a cathode coupled to the second connection point. The first switch element and the second switch element are configured to select either the first impedance transformer or the second impedance transformer as a first target transformer, and the selected first target transformer is coupled between the first connection point and the signal feeding element.

20 Claims, 7 Drawing Sheets

(56) References Cited

U.S. PATENT DOCUMENTS

| | | | | |
|---|---|---|---|---|
| 10,574,287 | B1* | 2/2020 | Thoppay Egambaram | H03F 3/245 |
| 2002/0006810 | A1* | 1/2002 | Schiller | H01Q 21/30 455/552.1 |
| 2004/0130391 | A1* | 7/2004 | Kim | H03F 1/0211 330/51 |
| 2006/0232342 | A1* | 10/2006 | Floyd | H03F 3/195 330/305 |
| 2006/0284685 | A1* | 12/2006 | Vaisanen | H03H 7/38 330/295 |
| 2007/0018720 | A1* | 1/2007 | Wright | H03F 3/72 330/51 |
| 2008/0117894 | A1* | 5/2008 | McMorrow | H03F 3/217 370/359 |
| 2010/0117920 | A1* | 5/2010 | Ku | H01Q 9/145 343/853 |
| 2013/0207877 | A1* | 8/2013 | Shtrom | H01Q 21/24 343/893 |
| 2014/0062613 | A1* | 3/2014 | Wolfson | H01Q 1/36 333/103 |
| 2014/0062817 | A1* | 3/2014 | Ishizuka | H03H 7/40 330/192 |
| 2015/0188581 | A1* | 7/2015 | Wong | H01Q 9/42 455/188.1 |
| 2016/0172740 | A1* | 6/2016 | Srirattana | H01P 5/185 333/101 |
| 2016/0323053 | A1* | 11/2016 | Kang | H04B 7/04 |
| 2017/0084998 | A1* | 3/2017 | Ishizuka | H01Q 1/243 |
| 2018/0090836 | A1* | 3/2018 | Lin | H01Q 3/24 |
| 2018/0159222 | A1* | 6/2018 | Backes | H03H 7/40 |
| 2019/0123441 | A1* | 4/2019 | Sudo | H01Q 1/243 |
| 2020/0067539 | A1* | 2/2020 | Park | H01Q 5/335 |
| 2020/0212571 | A1* | 7/2020 | Qiu | H01Q 13/10 |
| 2020/0411950 | A1* | 12/2020 | Kuroda | H01Q 1/2283 |
| 2021/0105047 | A1* | 4/2021 | Mishra | H04B 1/006 |
| 2022/0021350 | A1* | 1/2022 | Hase | H03F 3/245 |
| 2022/0077715 | A1* | 3/2022 | Doron | H04B 5/24 |
| 2022/0337273 | A1* | 10/2022 | Black | H04B 1/006 |
| 2022/0385331 | A1* | 12/2022 | Balteanu | H04B 1/48 |
| 2022/0393345 | A1* | 12/2022 | Kobayashi | H03H 7/38 |
| 2023/0163792 | A1* | 5/2023 | Aviv | H04B 1/0057 455/552.1 |
| 2023/0178888 | A1* | 6/2023 | Jervis | H01Q 3/247 343/702 |
| 2023/0369759 | A1* | 11/2023 | Huang | H01Q 9/0407 |
| 2023/0420845 | A1* | 12/2023 | Huang | H01Q 21/10 |
| 2025/0070468 | A1* | 2/2025 | Chiang | H01Q 5/335 |

* cited by examiner

ANTENNA SYSTEM WITH SWITCHABLE RADIATION GAIN

CROSS REFERENCE TO RELATED APPLICATIONS

This application claims priority of Taiwan Patent Application No. 111123868 filed on Jun. 27, 2022, the entirety of which is incorporated by reference herein.

BACKGROUND OF THE INVENTION

Field of the Invention

The disclosure generally relates to an antenna system, and more particularly, to an antenna system with switchable radiation gain.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Wireless access points are indispensable elements for allowing mobile devices in a room to connect to the Internet at high speeds. However, since indoor environments often experience serious signal reflection and multipath fading, wireless access points should process signals having different strengths simultaneously. Accordingly, it has become a critical challenge for current designers to design a small-size antenna system with switchable radiation gain in the limited space of a wireless access point.

BRIEF SUMMARY OF THE INVENTION

In an exemplary embodiment, the invention is directed to an antenna system with switchable radiation gain. The antenna system includes a signal feeding element, a first antenna element, a second antenna element, a first diode, a first switch element, a second switch element, a first impedance transformer, and a second impedance transformer. The first antenna element is coupled to a first connection point. The second antenna element is coupled to a second connection point. The first diode has an anode coupled to the first connection point, and a cathode coupled to the second connection point. The first switch element and the second switch element are configured to select either the first impedance transformer or the second impedance transformer as a first target transformer. The selected first target transformer is coupled between the first connection point and the signal feeding element.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
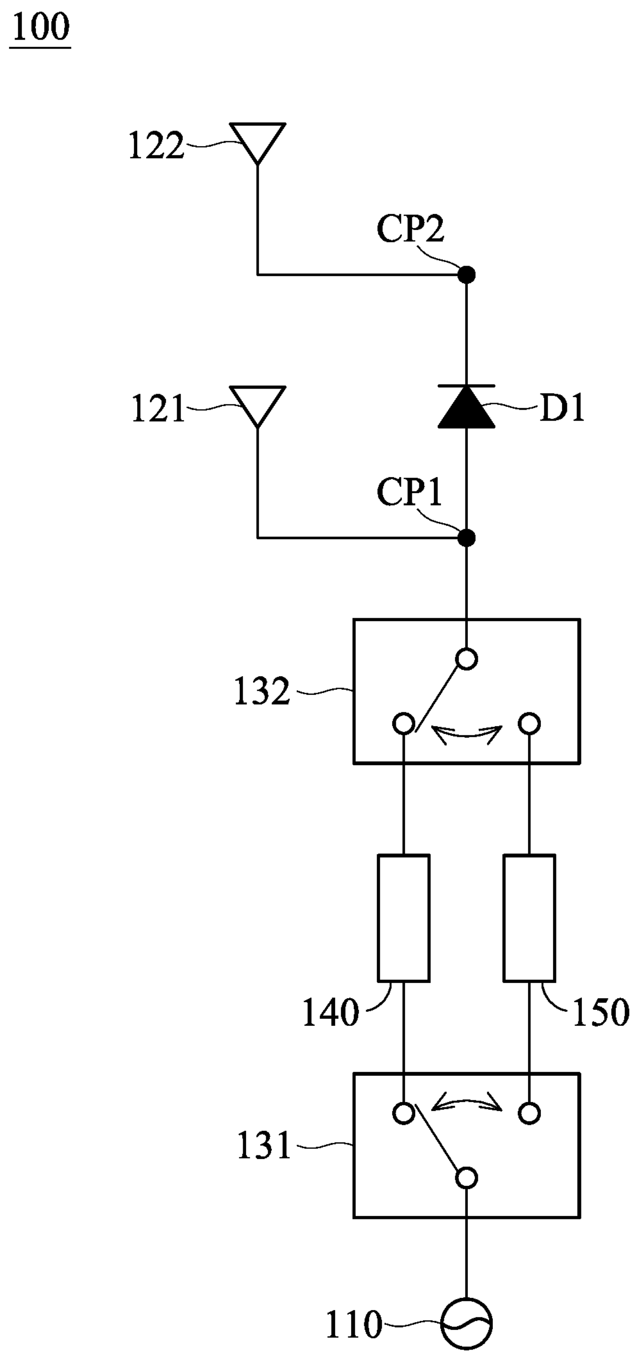
FIG. 1 is a diagram of an antenna system according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of an antenna system 100 according to an embodiment of the invention. For example, the antenna system 100 may be applied to a wireless access point, but it is not limited thereto. In the embodiment of FIG. 1, the antenna system 100 at least includes a signal feeding element 110, a first antenna element 121, a second antenna element 122, a first diode D1, a first switch element 131, a second switch element 132, a first impedance transformer 140, and a second impedance transformer 150.

The signal feeding element 110 may be implemented with one or more feeding metal elements. For example, the signal feeding element 110 may be coupled to an RF (Radio Frequency) module (not shown) for exciting the antenna system 100.

The shapes and types of the first antenna element 121 and the second antenna element 122 are not limited in the invention. For example, each of the first antenna element 121 and the second antenna element 122 may be a monopole antenna, a dipole antenna, a patch antenna, a loop antenna, a PIFA (Planar Inverted F Antenna), or a hybrid antenna. The first antenna element 121 is coupled to a first connection point CP1. The second antenna element 122 is coupled to a second connection point CP2.

In some embodiments, the first diode D1 is implemented with a PIN diode, but it is not limited thereto. Specifically, the first diode D1 has an anode coupled to the first connection point CP1, and a cathode coupled to the second connection point CP2. For example, if the first diode D1 is turned on, the second antenna element 122 may be enabled. Conversely, if the first diode D1 is turned off, the second antenna element 122 may be disabled.

The first impedance transformer 140 and the second impedance transformer 150 may have different shapes, which are not limited in the invention. In some embodiments, each of the first switch element 131 and the second switch element 132 is implemented with an SPDT (Single Port Double Throw) switch. Specifically, the first switch element 131 and the second switch element 132 are configured to select either the first impedance transformer 140 or the second impedance transformer 150 as a first target transformer. The selected first target transformer is coupled between the first connection point CP1 and the signal feeding element 110, so as to adjust the impedance matching of the first antenna element 121 and/or the second antenna element 122. For example, the first diode D1, the first switch element 131, and the second switch element 132 may perform the above switching or selecting processes according to a user input or a control signal of a processor.

In some embodiments, if the first impedance transformer 140 is selected as the aforementioned first target transformer and the first diode D1 is turned off, the antenna system 100 will provide a relatively low radiation gain. Conversely, if the second impedance transformer 150 is selected as the aforementioned first target transformer and the first diode D1 is turned on, the antenna system 100 will provide a relatively high radiation gain. With such a series-connection design, the radiation gain of the antenna system 100 is adjusted and operated according to different requirements, so as to transmit or receive a variety of signals with different strengths. In some embodiments, the first impedance transformer 140 has a first impedance value, and the second impedance transformer 150 has a second impedance value. The first impedance value is greater than the second impedance value, but they are not limited thereto. Therefore, the proposed antenna system 100 of the invention can significantly improve the communication quality of the relative device.

The following embodiments will introduce different configurations and detailed structural features of the antenna system 100. It should be understood that these figures and descriptions are merely exemplary, rather than limitations of the invention.

Figure 2:
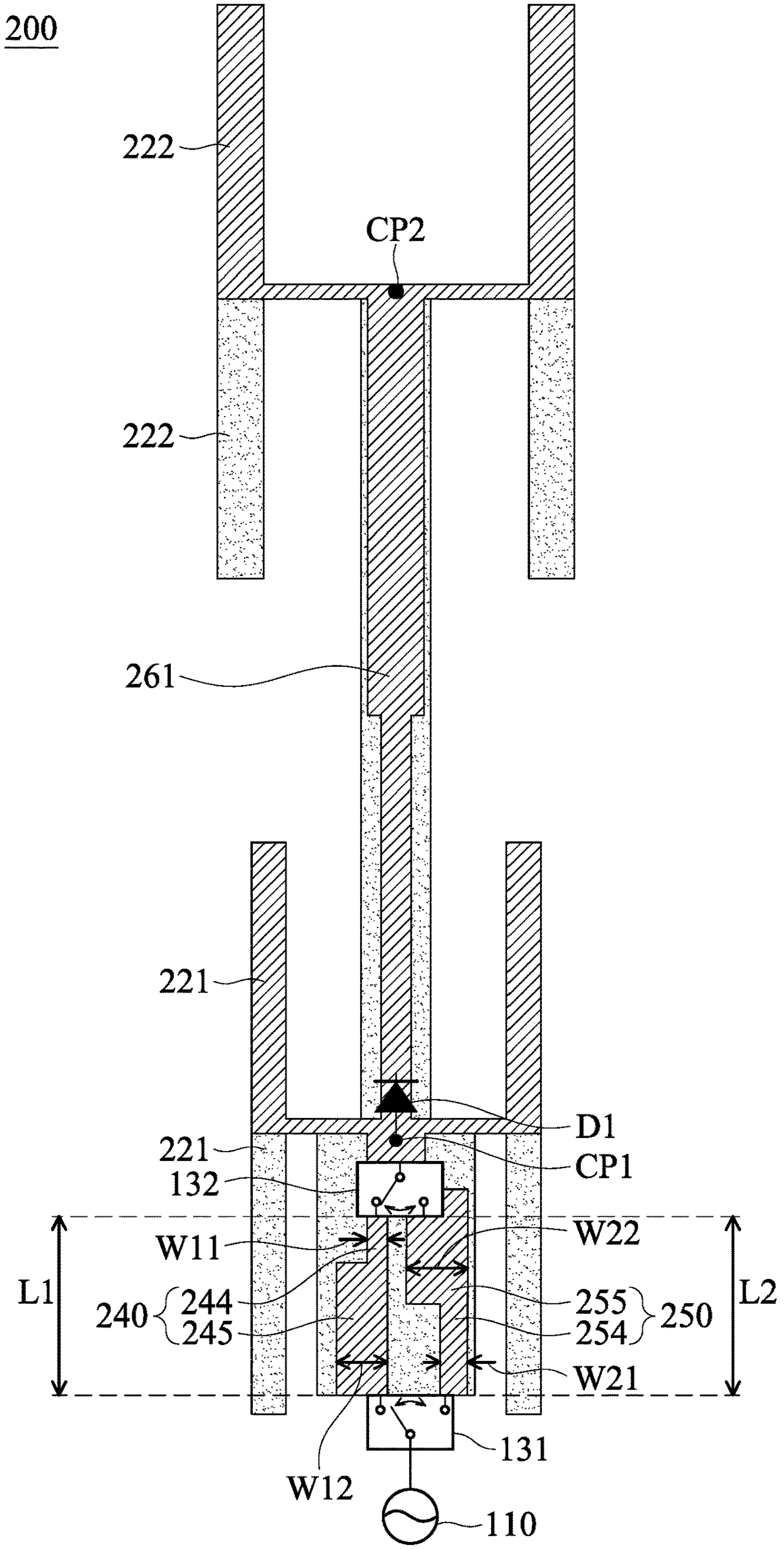
FIG. 2 is a front view of an antenna system according to an embodiment of the invention.

FIG. 2 is a front view of an antenna system 200 according to an embodiment of the invention. FIG. 2 is similar to FIG. 1. In the embodiment of FIG. 2, the antenna system 200 includes a signal feeding element 110, a first antenna element 221, a second antenna element 222, a first diode D1, a first switch element 131, a second switch element 132, a first impedance transformer 240, a second impedance transformer 250, and a first transmission line 261. The first antenna element 221 is coupled to a first connection point CP1. The second antenna element 222 is coupled to a second connection point CP2. For example, each of the first antenna element 221 and the second antenna element 222 is implemented with a dipole antenna. The above antenna elements may be distributed over a top surface and a bottom surface of a dielectric substrate (in order to simplify the figure, the dielectric substrate is not displayed in FIG. 2). As mentioned above, if the first impedance transformer 240 is selected by the first switch element 131 and the second switch element 132 and the first diode D1 is turned off, the antenna system 200 will provide a relatively low radiation gain. Conversely, if the second impedance transformer 250 is selected by the first switch element 131 and the second switch element 132 and the first diode D1 is turned on, the antenna system 200 will provide a relatively high radiation gain.

The first impedance transformer 240 may substantially have a variable-width straight-line shape, and the second impedance transformer 250 may substantially have another variable-width straight-line shape. Specifically, the first impedance transformer 240 includes a first narrow portion 244 and a first wide portion 245 which are coupled to each other. The first narrow portion 244 is coupled to the second switch element 132. The first wide portion 245 is coupled to the first switch element 131. In addition, the second impedance transformer 250 includes a second narrow portion 254 and a second wide portion 255 which are coupled to each other. The second narrow portion 254 is coupled to the first switch element 131. The second wide portion 255 is coupled to the second switch element 132.

The first transmission line 261 may substantially have a variable-width straight-line shape for fine-tuning the impedance matching between the first antenna element 221 and the second antenna element 222. However, the invention is not limited thereto. In alternative embodiments, the first transmission line 261 is modified to have an equal-width straight-line shape. The first diode D1 has an anode coupled to the first connection point CP1, and a cathode coupled through the first transmission line 261 to the second connection point CP2. In some embodiments, the antenna system 200 further includes more antenna elements coupled to the first connection point CP1 and/or the second connection point CP2, thereby enhancing the whole symmetry.

In some embodiments, the antenna system 200 covers an operational frequency band. The operational frequency band may be from 5150 MHz to 5850 MHz, or from 5925 MHz to 7125 MHz. Accordingly, the antenna system 200 can support the wideband operations of conventional WLAN (Wireless Local Area Networks) or next-generation Wi-Fi 6E.

With respect to the element sizes, the length L1 of the first impedance transformer 240 may be substantially equal to 0.5 wavelength (0.5λ) of the operational frequency band of the antenna system 200. The length L2 of the second impedance transformer 250 may be substantially equal to 0.5 wavelength (0.5λ) of the operational frequency band of the antenna system 200. In the first impedance transformer 240, the width W11 of the first narrow portion 244 may be from 0.5 mm to 1.5 mm (e.g., about 0.8 mm), and the width W12 of the first wide portion 245 may be from 1.5 mm to 3 mm (e.g., about 2.2 mm). In the second impedance transformer 250, the width W21 of the second narrow portion 254 may be from 0.6 mm to 1.8 mm (e.g., about 1.15 mm), and the width W22 of the second wide portion 255 may be from 2 mm to 3.5 mm (e.g., about 2.75 mm). The above ranges of element sizes are calculated and obtained according to many experiment results, and they help to optimize the operational bandwidth and the impedance matching of the antenna system 200. Other features of the antenna system 200 of FIG. 2 are similar to those of the antenna system 100 of FIG. 1. Accordingly, the two embodiments can achieve similar levels of performance.

Figure 3:
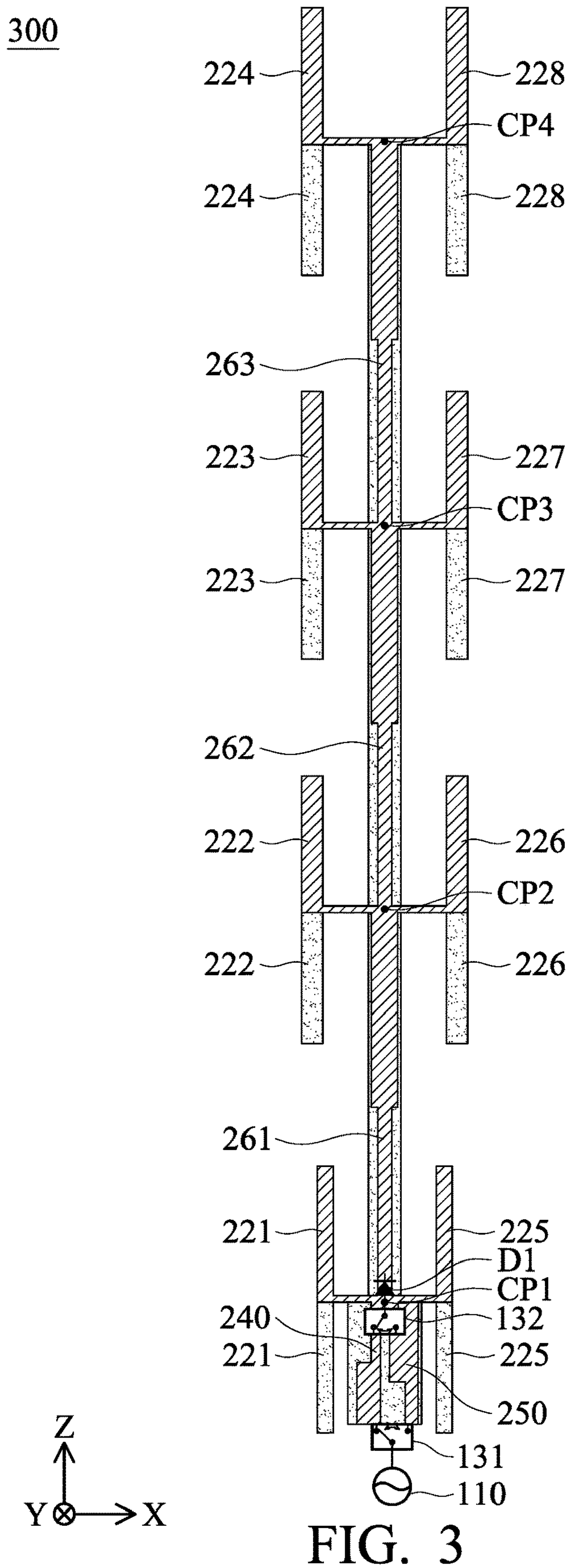
FIG. 3 is a front view of an antenna system according to an embodiment of the invention.

FIG. 3 is a front view of an antenna system 300 according to an embodiment of the invention. FIG. 3 is similar to FIG. 2. In the embodiment of FIG. 3, besides the aforementioned elements, the antenna system 300 further includes a second transmission line 262, a third transmission line 263, a third antenna element 223, a fourth antenna element 224, a fifth antenna element 225, a sixth antenna element 226, a seventh antenna element 227, and an eighth antenna element 228. Each of the third antenna element 223, the fourth antenna element 224, the fifth antenna element 225, the sixth antenna element 226, the seventh antenna element 227, and the eighth antenna element 228 is implemented with a dipole antenna. Specifically, the first antenna element 221 and the fifth antenna element 225 are coupled to the first connection point CP1, so as to form a first antenna array. The second antenna element 222 and the sixth antenna element 226 are coupled to the second connection point CP2, so as to form a second antenna array. The third antenna element 223 and the seventh antenna element 227 are coupled to a third connection point CP3, so as to form a third antenna array. The second transmission line 262 is coupled between the third connection point CP3 and the second connection point CP2. The fourth antenna element 224 and the eighth antenna element 228 are coupled to a fourth connection point CP4, so as to form a fourth antenna array. The third transmission line 263 is coupled between the fourth connection point CP4 and the third connection point CP3. It should be noted that the incorporation of more antenna elements can further enhance the radiation gain of the antenna system 300. In some embodiments, the first antenna element 221, the second antenna element 222, the third antenna element 223, and the fourth antenna element 224 are arranged in the same straight line, and the fifth antenna element 225, the sixth antenna element 226, the seventh antenna element 227, and the eighth antenna element 228 are arranged in another parallel straight line. It should be understood that the fifth antenna element 225, the sixth antenna element 226, the seventh antenna element 227, and the eighth antenna element 228 are configured to improve the whole symmetry of the antenna system 300. They are optional components and removable in other embodiments. Other features of the antenna system 300 of FIG. 3 are similar to those of the antenna system 200 of FIG. 2. Accordingly, the two embodiments can achieve similar levels of performance.

Figure 4:
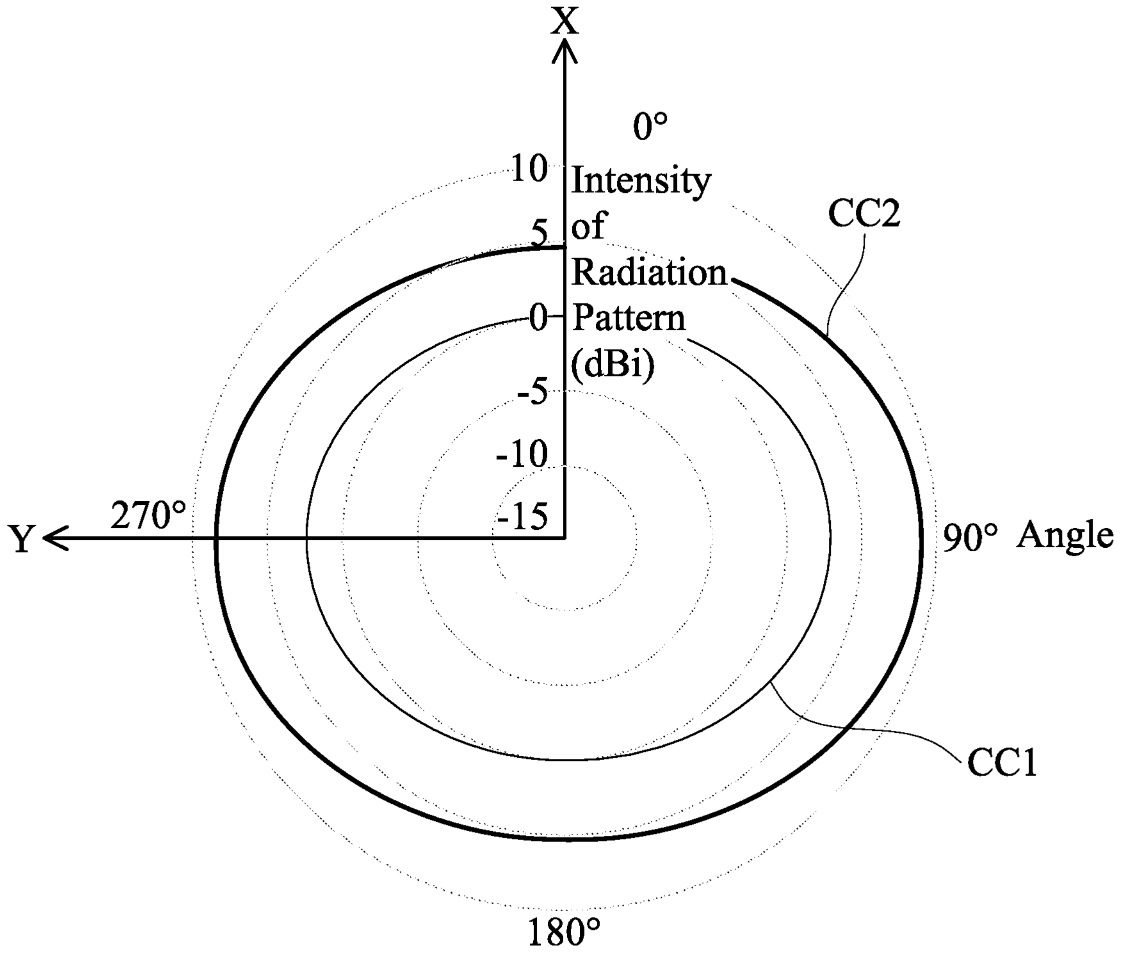
FIG. 4 is a top view of radiation pattern of an antenna system according to an embodiment of the invention.

FIG. 4 is a top view of radiation pattern of the antenna system 300 according to an embodiment of the invention, which may be measured along the XY-plane. As shown in FIG. 4, a first curve CC1 represents the radiation pattern of the antenna system 300 when the first impedance transformer 240 is selected and the first diode D1 is turned off, and a second curve CC2 represents the radiation pattern of the antenna system 300 when the second impedance transformer 250 is selected and the first diode D1 is turned on. According to the measurement of FIG. 4, the antenna system 300 can provide an almost omnidirectional radiation pattern, regardless of its radiation gain is relatively high or low.

Figure 5:
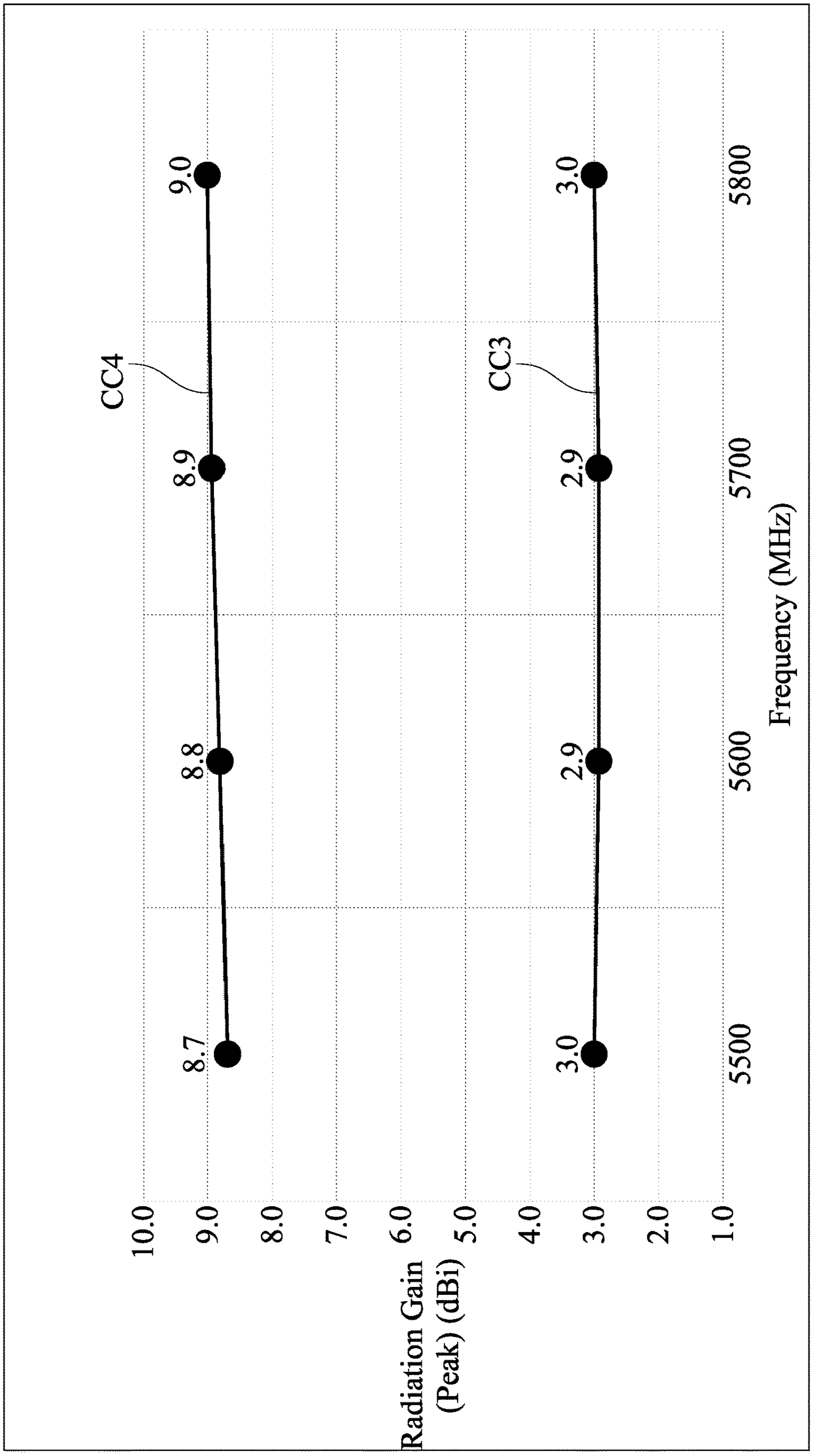
FIG. 5 is a diagram of radiation gain of an antenna system according to an embodiment of the invention.

FIG. 5 is a diagram of radiation gain of the antenna system 300 according to an embodiment of the invention. As shown in FIG. 5, a third curve CC3 represents the radiation gain of the antenna system 300 when the first impedance transformer 240 is selected and the first diode D1 is turned off, and a fourth curve CC4 represents the radiation gain of the antenna system 300 when the second impedance transformer 250 is selected and the first diode D1 is turned on. According to the measurement of FIG. 5, the antenna system 300 has switchable radiation gain. Its relatively low radiation gain reaches about 3 dBi and its relatively high radiation gain reaches about 9 dBi, which meets the requirements on the practical application of general mobile communication devices.

Figure 6:
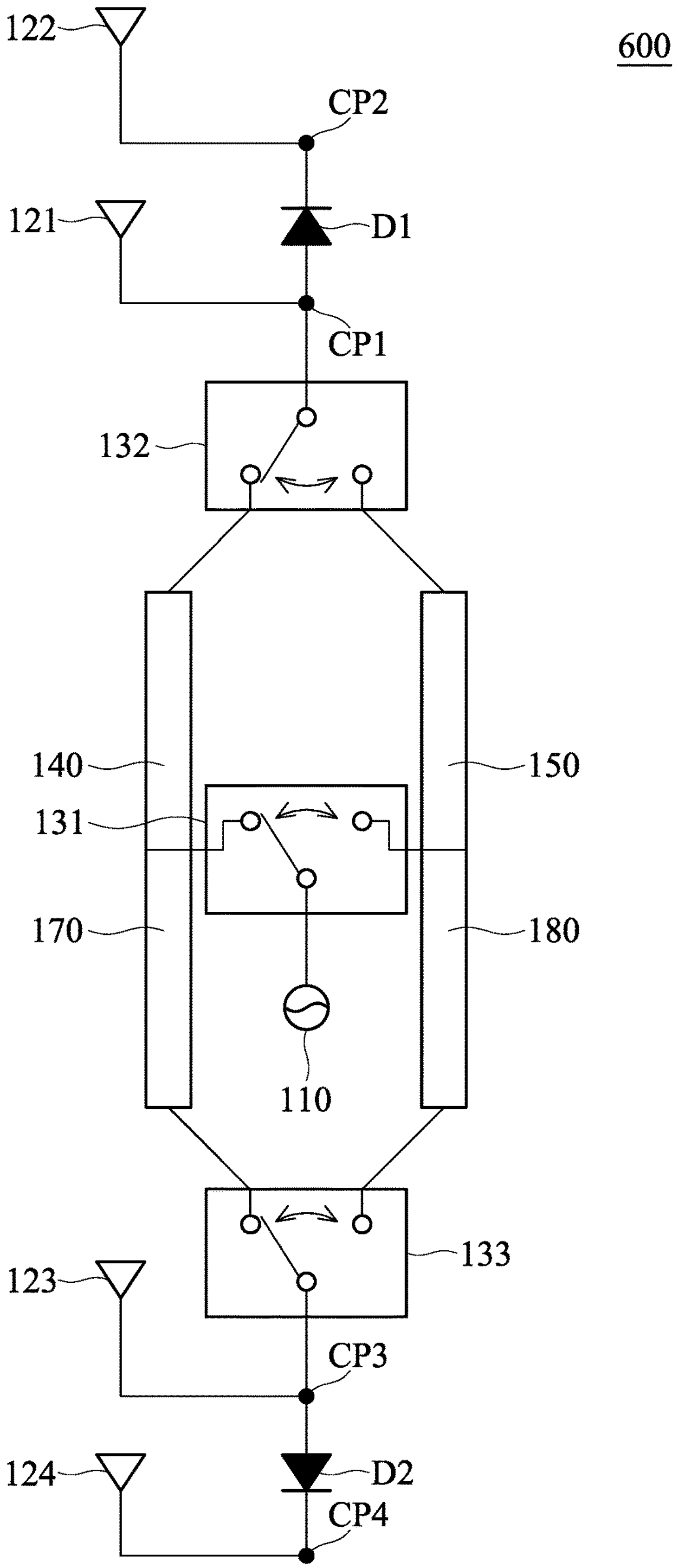
FIG. 6 is a diagram of an antenna system according to an embodiment of the invention.

FIG. 6 is a diagram of an antenna system 600 according to an embodiment of the invention. FIG. 6 is similar to FIG. 1. In the embodiment of FIG. 6, besides the aforementioned elements, the antenna system 600 further includes a second diode D2, a third antenna element 123, a fourth antenna element 124, a third switch element 133, a third impedance transformer 170, and a fourth impedance transformer 180. The third antenna element 123 is coupled to a third connection point CP3. The fourth antenna element 124 is coupled to a fourth connection point CP4. In some embodiments, the second diode D2 is implemented with another PIN diode. Specifically, the second diode D2 has an anode coupled to the third connection point CP3, and a cathode coupled to the fourth connection point CP4. For example, if the second diode D2 is turned on, the fourth antenna element 124 may be enabled. Conversely, if the second diode D2 is turned off, the fourth antenna element 124 may be disabled. The third impedance transformer 170 and the fourth impedance transformer 180 may have different shapes. In some embodiments, the third switch element 133 is implemented with another SPDT switch. Specifically, the first switch element 131 and the third switch element 133 are configured to select either the third impedance transformer 170 or the fourth impedance transformer 180 as a second target transformer. The selected second target transformer is coupled between the signal feeding element 110 and the third connection point CP3, so as to adjust the impedance matching of the third antenna element 123 and/or the fourth antenna element 124. For example, the second diode D2, the first switch element 131, and the third switch element 133 may perform the above switching or selecting processes according to a user input or a control signal of a processor. In some embodiments, if the third impedance transformer 170 is selected as the aforementioned second target transformer and the second diode D2 is turned off (at the same time, the first impedance transformer 140 is selected as the aforementioned first target transformer and the first diode D1 is turned off), the antenna system 600 will provide a relatively low radiation gain. Conversely, if the fourth impedance transformer 180 is selected as the aforementioned second target transformer and the second diode D2 is turned on (at the same time, the second impedance transformer 150 is selected as the aforementioned first target transformer and the first diode D1 is turned on), the antenna system 600 will provide a relatively high radiation gain. With such a parallel-connection design, the radiation gain of the antenna system 600 is adjusted and operated according to different requirements, so as to transmit or receive a variety of signals with different strengths. In some embodiments, each of the first impedance transformer 140 and the third impedance transformer 170 has a first impedance value, and each of the second impedance transformer 150 and the fourth impedance transformer 180 has a second impedance value. The second impedance value is greater than the first impedance value, but they are not limited thereto. Therefore, the proposed antenna system 600 of the invention can significantly improve the communication quality of the relative device. Other features of the antenna system 600 of FIG. 6 are similar to those of the antenna system 100 of FIG. 1. Accordingly, the two embodiments can achieve similar levels of performance.

Figure 7:
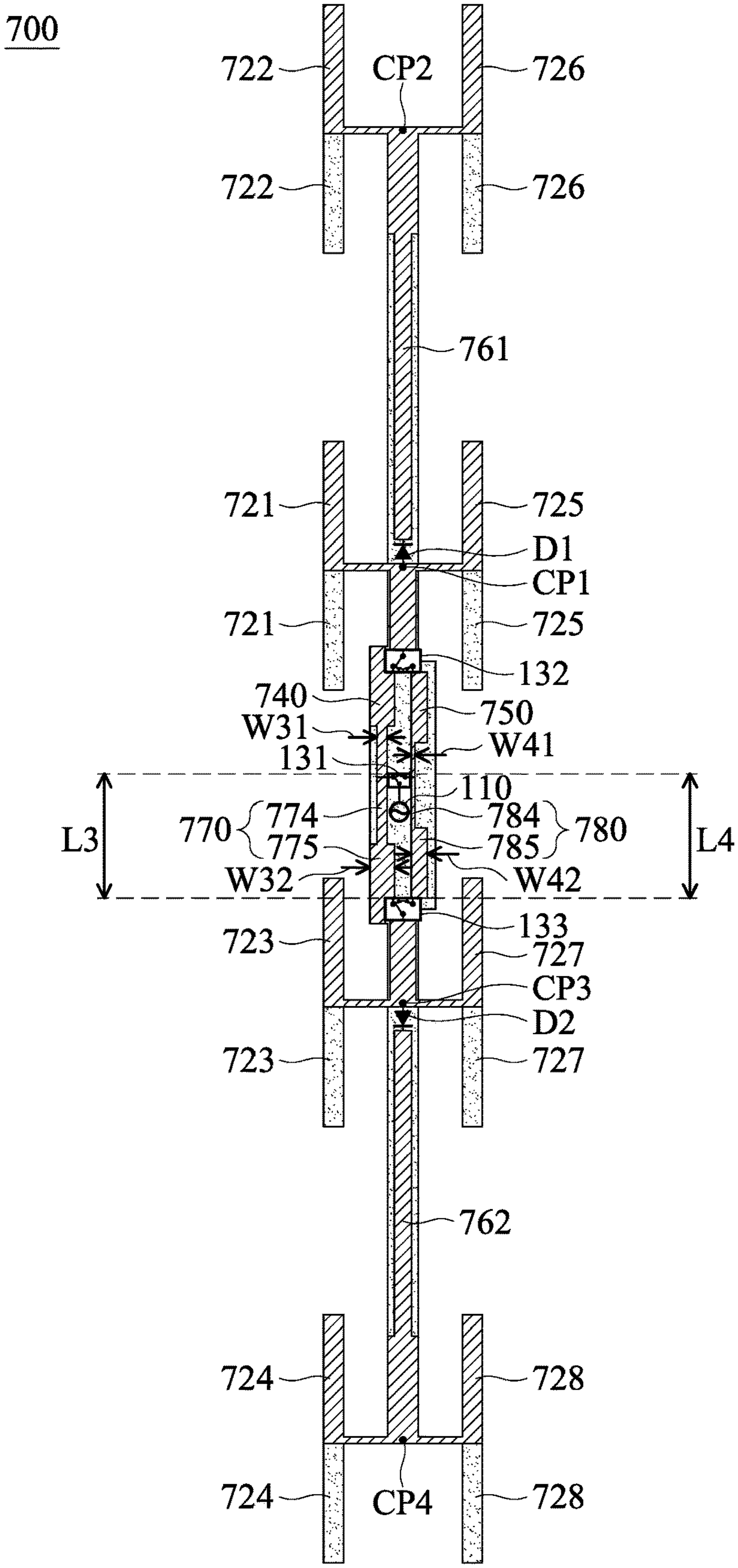
FIG. 7 is a front view of an antenna system according to an embodiment of the invention.

FIG. 7 is a front view of an antenna system 700 according to an embodiment of the invention. FIG. 7 is similar to FIG. 2 and FIG. 6. In the embodiment of FIG. 7, the antenna system 700 includes a signal feeding element 110, a first antenna element 721, a second antenna element 722, a third antenna element 723, a fourth antenna element 724, a first diode D1, a second diode D2, a first switch element 131, a second switch element 132, a third switch element 133, a first impedance transformer 740, a second impedance transformer 750, a first transmission line 761, a second transmission line 762, a third impedance transformer 770, and a fourth impedance transformer 780. The first antenna element 721 is coupled to a first connection point CP1. The second antenna element 722 is coupled to a second connection point CP2. The third antenna element 723 is coupled to a third connection point CP3. The fourth antenna element 724 is coupled to a fourth connection point CP4. For example, each of the first antenna element 721, the second antenna element 722, the third antenna element 723, and the fourth antenna element 724 may be implemented with a dipole antenna. The above antenna elements may be distributed over a top surface and a bottom surface of a dielectric substrate (in order to simplify the figure, the dielectric substrate is not displayed in FIG. 4).

The third impedance transformer 770 may substantially have a variable-width straight-line shape, and the fourth impedance transformer 780 may substantially have another variable-width straight-line shape. Specifically, the third impedance transformer 770 includes a third narrow portion 774 and a third wide portion 775 which are coupled to each other. The third narrow portion 774 is coupled to the first switch element 131. The third wide portion 775 is coupled to the third switch element 133. In addition, the fourth impedance transformer 780 includes a fourth narrow portion 784 and a fourth wide portion 785 which are coupled to each other. The fourth narrow portion 784 is coupled to the first switch element 131. The fourth wide portion 785 is coupled to the third switch element 133. The first impedance transformer 740 is symmetrical with the third impedance transformer 770. The second impedance transformer 750 is symmetrical with the fourth impedance transformer 780. Their structural features will not be illustrated again herein.

The second transmission line 762 may substantially have a variable-width straight-line shape for fine-tuning the impedance matching between the third antenna element 723 and the fourth antenna element 724. However, the invention is not limited thereto. In alternative embodiments, the second transmission line 762 is modified to have an equal-width straight-line shape. The second diode D2 has an anode coupled to the third connection point CP3, and a cathode coupled through the second transmission line 762 to the fourth connection point CP4.

In some embodiments, the antenna system 700 further includes a fifth antenna element 725, a sixth antenna element 726, a seventh antenna element 727, and an eighth antenna element 728. The fifth antenna element 725 is coupled to the first connection point CP1. The sixth antenna element 726 is coupled to the second connection point CP2. The seventh antenna element 727 is coupled to the third connection point CP3. The eighth antenna element 728 is coupled to the fourth connection point CP4. It should be understood that the fifth antenna element 725, the sixth antenna element 726, the seventh antenna element 727, and the eighth antenna element 728 are configured to improve the whole symmetry of the antenna system 700. They are optional components and removable in other embodiments.

In some embodiments, the antenna system 700 covers an operational frequency band. The operational frequency band may be from 5150 MHz to 5850 MHz, or from 5925 MHz to 7125 MHz. Accordingly, the antenna system 700 can support the wideband operations of conventional WLAN or next-generation Wi-Fi 6E.

With respect to the element sizes, the length L3 of the third impedance transformer 770 may be substantially equal to 0.5 wavelength (0.5λ) of the operational frequency band of the antenna system 700. The length L4 of the fourth impedance transformer 780 may be substantially equal to 0.5 wavelength (0.5λ) of the operational frequency band of the antenna system 700. In the third impedance transformer 770, the width W31 of the third narrow portion 774 may be from 0.5 mm to 1.5 mm (e.g., about 0.9 mm), and the width W32 of the third wide portion 775 may be from 2 mm to 3 mm (e.g., about 2.5 mm). In the fourth impedance transformer 780, the width W41 of the fourth narrow portion 784 may be from 0.1 mm to 1 mm (e.g., about 0.45 mm), and the width W42 of the fourth wide portion 785 may be from 1 mm to 2 mm (e.g., about 1.6 mm). The above ranges of element sizes are calculated and obtained according to many experiment results, and they help to optimize the operational bandwidth and the impedance matching of the antenna system 700. Other features of the antenna system 700 of FIG. 7 are similar to those of the antenna system 200 of FIG. 2 and the antenna system 600 of FIG. 6. Accordingly, these embodiments can achieve similar levels of performance.

The invention proposes a novel antenna system. In comparison to the conventional design, the invention has at least the advantages of switchable radiation gain, small size, and low manufacturing cost. Therefore, the invention is suitable for application in a variety of communication devices.

Note that the above element sizes, element shapes, and frequency ranges are not limitations of the invention. An antenna designer can fine-tune these settings or values according to different requirements. It should be understood that the antenna system of the invention is not limited to the configurations of FIGS. 1-7. The invention may merely include any one or more features of any one or more embodiments of FIGS. 1-7. In other words, not all of the features displayed in the figures should be implemented in the antenna system of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna system with switchable radiation gain, comprising:

a signal feeding element;

a first antenna element, coupled to a first connection point;

a second antenna element, coupled to a second connection point;

a first diode, wherein the first diode has an anode coupled to the first connection point, and a cathode coupled to the second connection point;

a first impedance transformer;

a second impedance transformer;

a first switch element; and a second switch element, wherein the first switch element and the second switch element are configured to select either the first impedance transformer or the second impedance transformer as a first target transformer, and the first target transformer is coupled between the first connection point and the signal feeding element.

2. The antenna system as claimed in claim 1, wherein if the first impedance transformer is selected as the first target transformer and the first diode is turned off, the antenna system provides a relatively low radiation gain, and wherein if the second impedance transformer is selected as the first target transformer and the first diode is turned on, the antenna system provides a relatively high radiation gain.

3. The antenna system as claimed in claim 1, wherein the antenna system covers an operational frequency band, and the operational frequency band is from 5150 MHz to 5850 MHz or from 5925 MHz to 7125 MHz.

4. The antenna system as claimed in claim 1, wherein each of the first antenna element and the second antenna element is implemented with a dipole antenna.

5. The antenna system as claimed in claim 1, wherein the first diode is implemented with a PIN diode.

6. The antenna system as claimed in claim 1, wherein the first impedance transformer substantially has a variable-width straight-line shape, and the second impedance transformer substantially has another variable-width straight-line shape.

7. The antenna system as claimed in claim 1, wherein the first impedance transformer comprises a first narrow portion and a first wide portion coupled to each other, and the second impedance transformer comprises a second narrow portion and a second wide portion coupled to each other.

8. The antenna system as claimed in claim 1, wherein the first impedance transformer has a first impedance value, the second impedance transformer has a second impedance value, and the first impedance value is greater than the second impedance value.

9. The antenna system as claimed in claim 3, wherein a length of each of the first impedance transformer and the second impedance transformer is substantially equal to 0.5 wavelength of the operational frequency band.

10. The antenna system as claimed in claim 1, further comprising:

a first transmission line, wherein the cathode of the first diode is further coupled through the first transmission line to the second connection point.

11. The antenna system as claimed in claim 10, further comprising:

a third antenna element, coupled to a third connection point; and a second transmission line, coupled between the third connection point and the second connection point.

12. The antenna system as claimed in claim 11, further comprising:

a fourth antenna element, coupled to a fourth connection point; and a third transmission line, coupled between the fourth connection point and the third connection point.

13. The antenna system as claimed in claim 12, further comprising:

a fifth antenna element, coupled to the first connection point;

a sixth antenna element, coupled to the second connection point;

a seventh antenna element, coupled to the third connection point; and an eighth antenna element, coupled to the fourth connection point.

14. The antenna system as claimed in claim 3, further comprising:

a third impedance transformer;

a fourth impedance transformer;

a third switch element, wherein the first switch element and the third switch element are configured to select either the third impedance transformer or the fourth impedance transformer as a second target transformer, and the second target transformer is coupled between the signal feeding element and a third connection point; and a third antenna element, coupled to the third connection point.

15. The antenna system as claimed in claim 14, wherein the third impedance transformer substantially has a variable-width straight-line shape, and the fourth impedance transformer substantially has another variable-width straight-line shape.

16. The antenna system as claimed in claim 14, wherein the third impedance transformer comprises a third narrow portion and a third wide portion coupled to each other, and the fourth impedance transformer comprises a fourth narrow portion and a fourth wide portion coupled to each other.

17. The antenna system as claimed in claim 14, wherein each of the first impedance transformer and the third impedance transformer has a first impedance value, each of the second impedance transformer and the fourth impedance transformer has a second impedance value, and the second impedance value is greater than the first impedance value.

18. The antenna system as claimed in claim 14, wherein a length of each of the third impedance transformer and the fourth impedance transformer is substantially equal to 0.5 wavelength of the operational frequency band.

19. The antenna system as claimed in claim 14, further comprising:

a second diode, wherein the second diode has an anode coupled to the third connection point, and a cathode coupled to a fourth connection point; and a fourth antenna element, coupled to the fourth connection point.

20. The antenna system as claimed in claim 19, further comprising:

a second transmission line, wherein the cathode of the second diode is further coupled through the second transmission line to the fourth connection point.

* * * * *